(12) United States Patent
Zhou et al.

(10) Patent No.: US 11,200,437 B2
(45) Date of Patent: Dec. 14, 2021

(54) METHOD FOR IRIS-BASED LIVING BODY DETECTION AND RELATED PRODUCTS

(71) Applicant: GUANGDONG OPPO MOBILE TELECOMMUNICATIONS CORP., LTD., Guangdong (CN)

(72) Inventors: Yibao Zhou, Guangdong (CN); Xueyong Zhang, Guangdong (CN); Haitao Zhou, Guangdong (CN); Cheng Tang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 38 days.

(21) Appl. No.: 16/725,539

(22) Filed: Dec. 23, 2019

(65) Prior Publication Data

US 2020/0143187 A1 May 7, 2020

Related U.S. Application Data

(63) Continuation of application No. PCT/CN2018/090646, filed on Jun. 11, 2018.

(30) Foreign Application Priority Data

Jun. 30, 2017 (CN) .......................... 201710523091.0

(51) Int. Cl.
*G06K 9/00* (2006.01)
(52) U.S. Cl.
CPC ..... *G06K 9/00906* (2013.01); *G06K 9/00248* (2013.01); *G06K 9/00604* (2013.01)

(58) Field of Classification Search
CPC .......... G06K 9/00906; G06K 9/00597; G06K 9/00892; G06K 9/00221; G06K 9/00456;
(Continued)

(56) References Cited

U.S. PATENT DOCUMENTS

| 8,437,513 B1 | 5/2013 | Derakhshani et al. |
| 9,594,969 B1 | 3/2017 | Negi et al. |

(Continued)

FOREIGN PATENT DOCUMENTS

| CN | 101833646 | 9/2010 |
| CN | 101916361 | 12/2010 |

(Continued)

OTHER PUBLICATIONS

Pupil Dynamics for Iris Liveness Detection by Adam Czajka (Year: 2015).*

(Continued)

*Primary Examiner* — Nizar N Sivji
(74) *Attorney, Agent, or Firm* — Hodgson Russ LLP (57) ABSTRACT

A method for iris-based living body detection and related product are provided. The method includes the following. An iris image is divided into K regional images, where K is an integer greater than one. Living body detection is performed on the K regional images with P iris-based living body detection schemes to obtain K detection results, where P is an integer greater than one and less than or equal to K. Whether the iris image is obtained from an iris of a living body is determined according to the K detection results.

19 Claims, 5 Drawing Sheets

---

101 — DIVIDING AN IRIS IMAGE INTO *K* REGIONAL IMAGES, WHERE *K* IS AN INTEGER GREATER THAN ONE

102 — PERFORMING LIVING BODY DETECTION ON THE *K* REGIONAL IMAGES WITH *P* IRIS-BASED LIVING BODY DETECTION SCHEMES TO OBTAIN *K* DETECTION RESULTS, WHERE *P* IS AN INTEGER GREATER THAN ONE AND LESS THAN OR EQUAL TO *K*

103 — DETERMINING, ACCORDING TO THE *K* DETECTION RESULTS, WHETHER THE IRIS IMAGE IS OBTAINED FROM AN IRIS OF A LIVING BODY (58) Field of Classification Search
CPC ........... G06K 9/00248; G06K 9/00604; G06K 9/2018; G06K 9/4604; G06K 9/40; G06K 9/342
See application file for complete search history.

(56) References Cited

U.S. PATENT DOCUMENTS

2015/0098629 A1  4/2015  Perna et al.
2016/0117544 A1  4/2016  Hoyos et al.

FOREIGN PATENT DOCUMENTS

| CN | 101923640 | | 12/2010 |
|---|---|---|---|
| CN | 104240205 | | 12/2014 |
| CN | 105320939 | | 2/2016 |
| CN | 105447443 | | 3/2016 |
| CN | 105550661 | A * | 5/2016 |
| CN | 105608409 | | 5/2016 |
| CN | 105740914 | | 7/2016 |
| CN | 106408591 | | 2/2017 |

OTHER PUBLICATIONS

WIPO, ISR for PCT/CN2018/090646, Sep. 13, 2018.
EPO, Extended European Search Report for EP Application No. 18824914.8, dated Jul. 31, 2020.
SIPO, First Office Action for CN Application No. 201710523091.0, dated May 20, 2019.
SIPO, Second Office Action for CN Application No. 201710523091.0, dated Jul. 23, 2019.
SIPO, Third Office Action for CN Application No. 201710523091.0, dated Nov. 15, 2019.
SIPO, Decison of Rejection for CN Application No. 201710523091.0, dated Sep. 6, 2019.
Li, "Research on In vivo Iris Detection Algorithm Based on Convolutional Neural Network," Computer Engineering, May 2016, vol. 42, No. 5, 16 pages.
Ma et al., "Efficient Iris Recognition by Characterizing Key Local Variations," IEEE Transactions on Image Processing, Jun. 2004, vol. 13, No. 6, pp. 739-750.
Hu et al., "Iris liveness detection using regional features," Pattern Recognition Letters, 2016, vol. 82, pp. 242-250.
Tan et al., "Integrating Ocular and Iris Descriptors for Fake Iris Image Detection," 2nd International Workshop on Biometrics and Forensics, Mar. 2014, 4 pages.
Proenca et al., "Toward Noncooperative Iris Recognition: A Classification Approach Using Multiple Signatures," IEEE Transactions on Pattern Analysis and Machine Intelligence, Apr. 2007, vol. 29, No. 4, pp. 607-612.
EPO, Office Action for EP Application No. 18824914.8, dated Apr. 29, 2020.
SIPO, Notification to Grant Patent Right for Invention for CN Application No. 201710523091.0, dated Jul. 6, 2020.

* cited by examiner

METHOD FOR IRIS-BASED LIVING BODY DETECTION AND RELATED PRODUCTS

CROSS-REFERENCE TO RELATED APPLICATIONS

This application is a continuation of International Application No. PCT/CN2018/090646, filed on Jun. 11, 2018, which claims priority to Chinese Patent Application No. 201710523091.0, filed on Jun. 30, 2017, the entire disclosures of which are incorporated herein by reference.

TECHNICAL FIELD

This disclosure relates to the technical field of electronic device, and particularly to a method for iris-based living body detection and related products.

BACKGROUND

With increasing popularization and application of electronic devices (mobile phones, tablet computers, etc.), electronic devices can support more and more applications and become more powerful. The electronic devices are being improved in terms of diversification and individuation and have become indispensable electronic products in the lives of users.

Currently, iris recognition is increasingly favored by manufacturers of electronic devices. The security of iris recognition is also one of the most important concerns. For security reasons, in general, living body detection on iris will be performed first prior to iris recognition, but the current iris-based living body detection accuracy is not high.

SUMMARY

According to a first aspect, implementations provide a method for iris-based living body detection. The method includes the following. An iris image is divided into K regional images, where K is an integer greater than one. Living body detection is performed on the K regional images with P iris-based living body detection schemes to obtain K detection results, where P is an integer greater than one and less than or equal to K. Whether the iris image is obtained from an iris of a living body is determined according to the K detection results.

According to a second aspect, implementations of the disclosure provide an electronic device. The electronic device includes a camera configured to obtain an iris image, at least one processor coupled with the camera and a computer readable storage. The computer readable storage is coupled with the at least one processor and stores at least one computer executable instruction thereon which, when executed by the at least one processor, causes the at least one processor to execute the following. The iris image is divided into K regional images, where K is an integer greater than one. P iris-based living body detection schemes are applied on the K regional images, to obtain K detection results, where P is an integer greater than one and less than or equal to K. Whether the iris image is obtained from an iris of a living body is determined according to the K detection results.

According to a third aspect, implementations of the disclosure provide a non-transitory computer readable storage medium. The non-transitory computer readable storage medium is configured to store a computer program which, when executed by a processor, causes the processor to execute the following. An iris image is divided into K regional images, where K is an integer greater than one. P iris-based living body detection schemes are applied on the K regional images, to obtain K detection results, where P is an integer greater than one and less than or equal to K. Whether the iris image is obtained from an iris of a living body is determined according to the K detection results.

BRIEF DESCRIPTION OF THE DRAWINGS

In order to more clearly illustrate the technical solutions in the implementations of the disclosure or the conventional art, accompanying drawings needing to be used in the descriptions of the implementations or the conventional art will be simply introduced herein below. Obviously, the drawings described herein below are merely some implementations of the disclosure. Without making creative works, a person of ordinary skill in the art may also obtain other drawings according to these drawings.

DETAILED DESCRIPTION

In order to make a person skilled in the art better understand the solutions of the disclosure, the technical solutions in the implementations of the disclosure will be clearly and completely described herein below with reference to the drawings in the implementations of the disclosure. Obviously, the described implementations are only a part of the implementations of the disclosure, not all of the implementations. On the basis of the implementations of the disclosure, all other implementations obtained on the premise of no creative work of a person skilled in the art should fall within the scope of protection of the disclosure.

The specification and claims of the disclosure and terms "first", "second" and the like in the drawings are used for distinguishing similar objects rather than describing a specific sequence. In addition, terms "include" and "have" and any synonyms thereof are intended to cover non-exclusive inclusions. For example, processes, methods, systems, products or devices containing a series of operations or units are not limited to operations or units which have been already listed, and other operations or units which are not listed or are inherent to these processes, methods, products or devices are alternatively included instead.

"Implementations" in the disclosure means that specific features, structures or characteristics described in the implementations may be included in at least one implementation of the disclosure. The phrase occurring at each position in the specification is not always the same implementation, or not an independent or alternative implementation mutually exclusive to other implementations. A person skilled in the art explicitly and implicitly understands that the implementations described in the disclosure may be combined with other implementations.

Figure 1A:
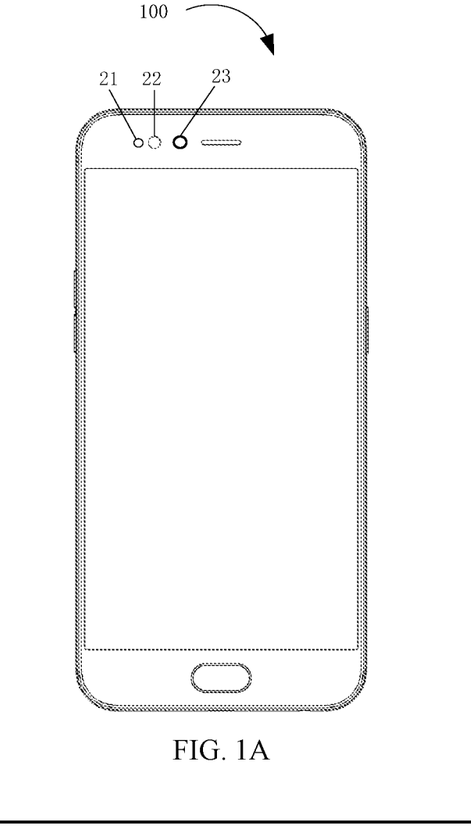
FIG. 1A is a schematic structural diagram of a smart phone according to implementations of the disclosure.

The electronic device involved in the implementations of the disclosure may include various handheld devices, on-board devices, wearable devices, computing devices that have a wireless communication function or other processing devices connected to a wireless modem, and various forms of user equipment (UE), mobile stations (MSs), terminal devices, etc. For the convenience of description, the above-mentioned devices are collectively referred to as electronic devices. The implementations of the disclosure will be introduced in detail below. FIG. 1A illustrates an example of a smart phone 100. An iris recognition device of the smart phone 100 may include an infrared fill light 21 and an infrared camera 22. During operation of the iris recognition device, the infrared fill light 21 emits light toward an iris, the light is reflected back to the infrared camera 22 via the iris, and then the iris recognition device acquires an iris image. Furthermore, a camera 23 may be a front camera.

Figure 1B:
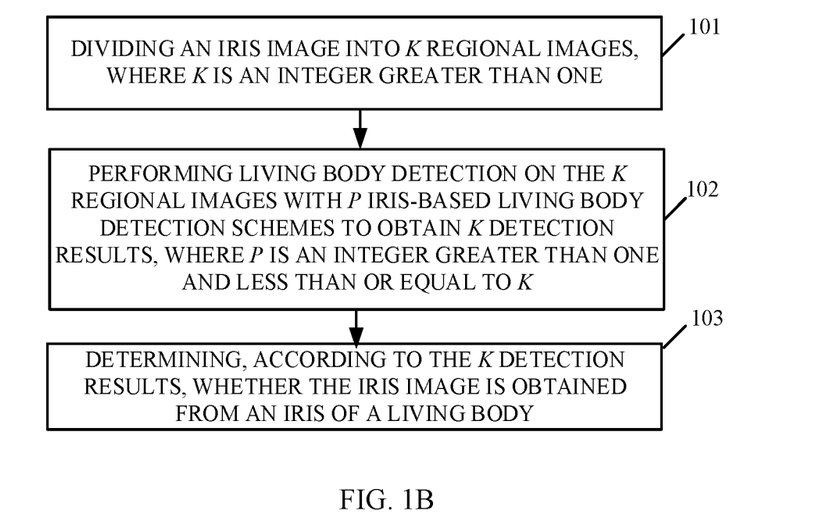
FIG. 1B is a flow chart of a method for iris-based living body detection according to implementations of the disclosure.

FIG. 1B is a flow chart of a method for iris-based living body detection according to implementations of the disclosure. The method is applicable to the smart phone as described in FIG. 1A. The method begins at 101.

At 101, an iris image is divided into K regional images, where K is an integer greater than one.

The iris image can be divided into the K regional images (K sub-image of the iris image), where the K regional images are independent from each other. That is, there is no overlap between the K regional images, and K is an integer greater than one. In an example, the iris image may be divided into the K regional images according to a preset grid. In another example, the iris image may be divided into the K regional images of equal area. The preset grid may be set by the user or by the system by default, for example, from a pre-stored grid template.

The iris image may be an image of an iris region or an image (for example, an eye image) including an iris region. That is, the iris image is obtained by shooting an iris of a subject. For example, when the electronic device is used by the user, the iris image can be acquired by the iris recognition device.

In an implementation, the following is further conducted.

A test image is obtained. The iris image is extracted from the test image.

The test image can include, in addition to the iris region, other regions (for example, regions around the iris region). Therefore, the test image can be segmented to obtain the iris image.

In an implementation, before 101, image enhancement is performed on the iris image.

The image enhancement may include, but is not limited to, image denoising (e.g., wavelet transform for image denoising), image restoration (e.g., Wiener filtering), scotopic vision enhancement scheme (e.g., histogram equalization, grayscale stretching, etc.). After the image enhancement is performed on the iris image, the quality of the iris image can be improved to some extent. Furthermore, in 101, the iris image subjected to the enhancement can be divided into the K regional images.

In an implementation, before 101, the following may be further conducted.

At A1, image quality evaluation is performed on the iris image to obtain an image quality evaluation value.

At A2, image enhancement is performed on the iris image when the image quality evaluation value is lower than a preset quality threshold.

The preset quality threshold may be set by the user or by the system by default. The image quality evaluation is performed on the iris image to obtain the image quality evaluation value, and the quality of the iris image is determined according to the image quality evaluation value. When the image quality evaluation value is greater than or equal to the preset quality threshold, the quality of the iris image is considered to be good. When the image quality evaluation value is less than the preset quality threshold, the quality of the iris image is considered to be poor, and thus, the iris image may be subjected to image enhancement. Furthermore, in 101, the iris image subjected to the enhancement may be divided into the K regional images.

In A1, at least one image quality evaluation indicator may be used to perform the image quality evaluation on the iris image, to obtain the image quality evaluation value.

Multiple image quality evaluation indicators can be used, where one image quality evaluation indicator corresponds to one weight. For each image quality evaluation indicator, one evaluation result can be obtained when performing the image quality evaluation on the iris image. Thereafter, these evaluation results are weighted to obtain the final image quality evaluation value. The image quality evaluation indicator may include, but are not limited to, mean, standard deviation, entropy, definition, signal to noise ratio, etc.

It should be noted that using a single image quality evaluation indicator to perform the image quality evaluation has certain limitations. Therefore, multiple image quality evaluation indicators can be used to perform image quality evaluation. In the evaluation of the image quality, more image quality evaluation indicators do not necessarily result in better evaluation result. This is because more image quality evaluation indicators may lead to higher computational complexity of the image quality evaluation, and may not necessarily obtain better image quality evaluation result. Therefore, in the case of high requirements on the image quality evaluation, 2 to 10 image quality evaluation indicators can be used to evaluate the image quality. The number of image quality evaluation indicators and indicators are selected depending on specific conditions. It is also necessary to select image quality evaluation indicators according to specific scenes, such as image quality evaluation indicators used in the dark environment and in the bright environment can be different.

In the case of low requirements on image quality evaluation accuracy, one image quality evaluation indicator may be used for image quality evaluation. For example, the entropy is used to perform the image quality evaluation, to obtain the image quality evaluation value. The larger the entropy, the better the image quality, vice versa.

In the case of high requirements on image quality evaluation accuracy, multiple image quality evaluation indicators may be used for image quality evaluation. When the multiple image quality evaluation indicators are used to perform the image quality evaluation on the iris image, each image quality evaluation indicator can have one weight. According to the multiple image quality evaluation indicators, multiple image quality evaluation values can be obtained. Thereafter, according to multiple image quality evaluation values and their corresponding weights, a final image quality evaluation value can be obtained. For example, there are three image quality evaluation indicators: indicator A, indicator B, and indicator C. The indicator A has a weight of a1, the indicator B has a weight of a2, and the indicator C has a weight of a3. When the indicator A, the indicator B, and the indicator C are used to perform the image quality evaluation, an image quality evaluation value corresponding to A is b1, an image quality evaluation value corresponding to B is b2, and an image quality evaluation value corresponding to C is b3, then the final image quality evaluation value=a1b1+a2b2+a3b3. In general, the larger the image quality evaluation value, the better the image quality.

At 102, living body detection is performed on the K regional images with P iris-based living body detection schemes to obtain K detection results, where P is an integer greater than one and less than or equal to K.

The P (types of) iris-based living body detection schemes can be any living body detection scheme. Not every iris-based living body detection scheme can achieve error-free detection, that is, each iris-based living body detection scheme may have a certain probability of error-free detection, and each iris-based living body detection scheme corresponds to one reliability level. In an example, the P iris-based living body detection schemes are used to perform the living body detection on the K regional images. In the case that P=K, one iris-based living body detection scheme can be used for performing the living body detection on one of the K regional images. In the case that P is less than K, one iris-based living body detection scheme can be used for performing the living body detection on multiple regional images. The above P may be set by the user or by the system by default, which depends on actual conditions.

In 102, the living body detection is performed on the K regional images with the P iris-based living body detection schemes to obtain the K detection results as follows.

At 102-1, determine a regional characteristic of each of the K regional images to obtain K regional characteristics.

At 102-2, determine the P iris-based living body detection schemes corresponding to the K regional characteristics according to a mapping relationship between preset regional characteristics and iris-based living body detection schemes.

At 102-3, the living body detection is performed on the K regional images according to the P iris-based living body detection schemes to obtain the K detection results.

The above regional characteristics may be at least one of a number of feature points, an image quality evaluation value, definition, entropy, average brightness, etc. The points at interlaced spots, filaments, coronal, stripes, and crypts, and the like of the iris are feature points for identifying the uniqueness of the iris. The mapping relationship between the preset regional characteristics and the iris-based living body detection schemes can be obtained according to experiments. For example, in the case that the regional characteristic is the number of feature points, different iris-based living body detection schemes can be selected according to the number of feature points. For example, 0 to 5 feature points correspond to iris-based living body detection scheme A, 6 to 10 feature points correspond to iris-based living body detection scheme B, 11 to 15 feature points correspond to iris-based living body detection scheme C, and so on. The regional characteristic of each of the K regional images can be determined to obtain the K regional characteristics. Furthermore, the P iris-based living body detection schemes corresponding to the K regional characteristics can be determined according to the mapping relationship between the preset regional characteristics and the iris-based living body detection schemes. It is possible that some of the K regional characteristics correspond to one iris-based living body detection scheme. Furthermore, the K regional images can be subjected to the living body detection according to the P iris-based living body detection schemes, to obtain K detection results, where one detection result corresponds to one regional image. In this way, the living body detection can be performed on different regions according to regional characteristics of the different regions, and the error detection rate can be reduced to some extent.

In an example, the iris-based living body detection schemes may be at least one of an iris-based living body detection scheme based on support vector machine (SVM), an iris-based living body detection scheme based on neural network, and an iris-based living body detection scheme based on genetic algorithm, etc.

At 103, determine, according to the K detection results, whether the iris image is obtained from an iris of a living body.

Among the K detection results, some may indicate that the iris image is from an iris of a living body, and others may indicate that the iris image is from an iris of a non-living body. When most of the K detection results indicate that the iris image is from an iris of a living body, the iris image is from an iris of a living body. The iris of a non-living body may be one of a 3D printed iris, an iris in a photograph, and an iris of a person without vital signs, which are not limited herein.

In 103, determine, according to the K detection results, whether the iris image is from an iris of a living body as follows.

At 103-1, determine a reliability level corresponding to each of the P iris-based living body detection schemes to obtain P (types of) reliability level.

At 103-2, the K detection results and the P reliability levels are weighted to obtain a target detection result.

At 103-3, determine that the iris image is obtained from an iris of a living body when the target detection result is greater than a preset threshold.

The preset threshold may be set by the user or set by the system by default in advance. Each of the P iris-based living body detection schemes corresponds to one reliability level, that is, a probability of a correct detection result. The reliability level can be obtained as follows, for example, 1000 iris images are tested and then a ratio of a number of correct detection results to a total number of detection results (1000) is determined as the reliability level. Each detection result may correspond to one reliability level. The K detection results and their corresponding reliability levels are weighted to obtain the target detection result. In an example, a detection result indicating "living body" can be defined as 1, a detection result indicating "non-living body" can be defined as 0. For example, there are five detection results: A, B, C, D, and E, where A and B correspond to an iris-based living body detection scheme a and the iris-based living body detection scheme a has a reliability level of k1, C and D correspond to an iris-based living body detection scheme b and the iris-based living body detection scheme b has a reliability level of k2, and E corresponds to an iris-based living body detection scheme c and the iris-based living body detection scheme c has a reliability level of k3.

If the detection result A indicates "living body", the detection result B indicates "non-living body", the detection results C and D indicate "living body", and the detection result E indicates "non-living body", then the target detection result is k1+2*k2. When the target detection result is greater than the preset threshold, the iris image can be considered to be from an iris of a living body. When the target detection result is less than or equal to the preset threshold, the iris image can be considered to be from an iris of a non-living body.

According to the implementation, the iris image is obtained. The iris image is divided into the K regional images, where K is an integer greater than one. The living body detection is performed on the K regional images with the P iris-based living body detection schemes to obtain the K detection results, where P is an integer greater than one and less than or equal to K. Whether the iris image is from an iris of a living body is determined according to the K detection results. In this way, the iris image is divided into multiple regions, one iris-based living body detection scheme is selected for each region to perform the living body detection, then multiple detection results are obtained, and whether the iris image is from an iris of a living body is determined according to the multiple detection results. It is possible to reduce an error detection rate caused by using a single iris-based living body detection scheme, and improve the accuracy of the iris-based living body detection.

Figure 2:
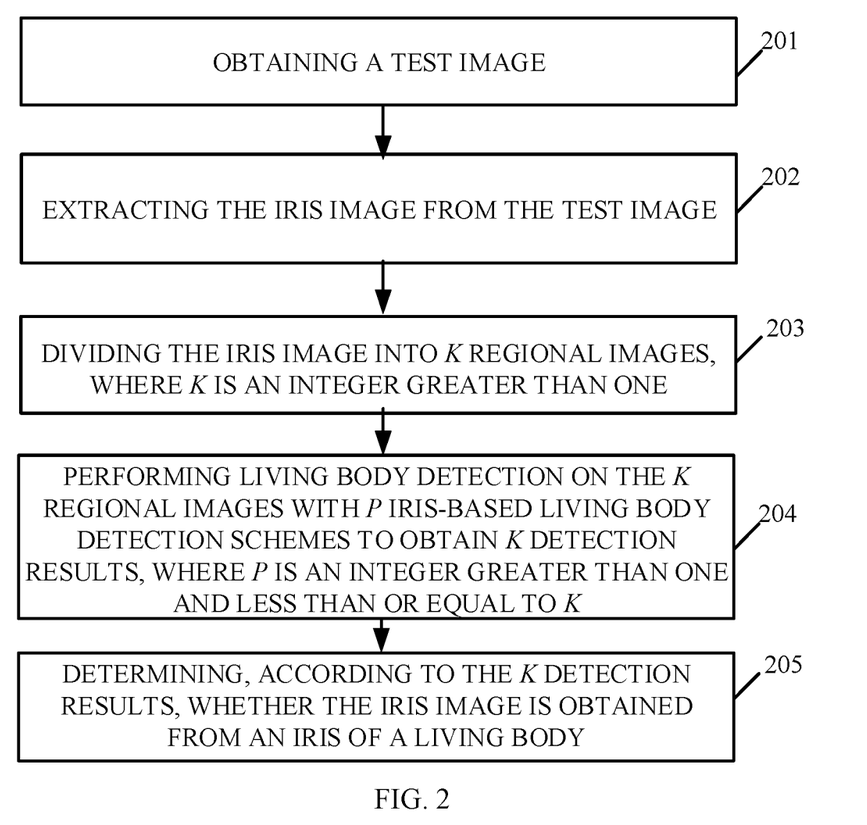
FIG. 2 is a flow chart of a method for iris-based living body detection according to other implementations of the disclosure.

FIG. 2 is a flow chart of a method for iris-based living body detection according to implementations of the disclosure. The method begins at 201.

At 201, a test image is obtained.

The test image can be a face image obtained by a camera of an electronic device. The test image can also be an eye image.

At 202, an iris image is extracted from the test image.

In 202, the iris image is extracted from the test image as follows.

At 221, eye recognition is performed on the test image to obtain an eye image.

At 222, contour extraction is performed on the eye image to obtain a contour image.

At 223, determine an iris contour from the contour image according to an eye structure.

At 224, the iris image is extracted from the eye image according to an iris contour.

The eye recognition may adopt a classifier, and the classifier may be at least one of a support vector machine (SVM), an Adaboost classifier, a Bayesian classifier, etc., which are not limited herein. For example, the Adaboost classifier can be used to perform eye recognition on the test image to obtain the eye image, and the contour extraction is further performed on the eye image to obtain the contour image. The contour extraction can be at least one of Hough transform, haar operator, Canny operator, etc., which are not limited herein. The eye structure decides the position and the shape of the iris contour. Therefore, the iris contour can be determined from the contour image according to the eye structure. Thereafter, an image of a corresponding region can be selected from the eye image according to the iris contour, that is, the iris image.

At 203, the iris image is divided into K regional images, where K is an integer greater than one.

At 204, living body detection is performed on the K regional images with P iris-based living body detection schemes to obtain K detection results, where P is an integer greater than one and less than or equal to the K.

At 205, determine, according to the K detection results, whether the iris image is obtained from an iris of a living body.

For a detailed description of 202-205, reference may be made to the method described in FIG. 1B, which will not be described in further detail herein.

According to the implementation, the test image is obtained and the iris image is extracted from the test image. The iris image is divided into the K regional images, where K is an integer greater than one. The living body detection is performed on the K regional images with the P iris-based living body detection schemes to obtain the K detection results, where P is an integer greater than one and less than or equal to K. Whether the iris image is from an iris of a living body is determined according to the K detection results. In this way, the iris image is divided into multiple regions, one iris-based living body detection scheme is selected for each region to perform the living body detection, then multiple detection results are obtained, and whether the iris image is from an iris of a living body is determined according to the multiple detection results. It is possible to reduce an error detection rate caused by using a single iris-based living body detection scheme, and improve the accuracy of the iris-based living body detection.

Figure 3:
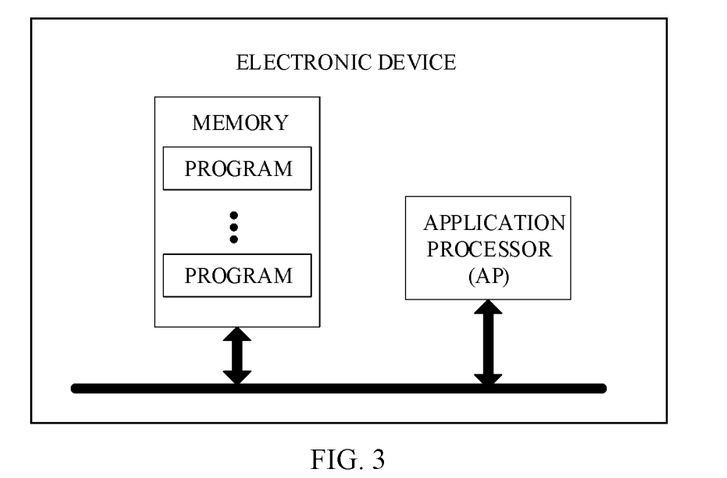
FIG. 3 is a schematic structural diagram of an electronic device according to implementations of the disclosure.

FIG. 3 is an electronic device according to implementations of the disclosure. The electronic device includes a camera configured to obtain an iris image, at least one processor coupled with the camera and a computer readable storage. The computer readable storage is coupled with the at least one processor and stores at least one computer executable instruction thereon which, when executed by the at least one processor, causes the at least one processor to execute the following. The iris image is divided into K regional images, where K is an integer greater than one. P iris-based living body detection schemes are applied on the K regional images, to obtain K detection results, where P is an integer greater than one and less than or equal to K. Whether the iris image is obtained from an iris of a living body is determined according to the K detection results.

In an implementation, in terms of performing the living body detection on the K regional images with the P iris-based living body detection schemes to obtain the K detection results, the at least one processor is configured to perform the following.

A region characteristic of each of the K regional images is determined to obtain K regional characteristics. Determine, according to a mapping relationship between preset regional characteristics and iris-based living body detection schemes, the P iris-based living body detection schemes corresponding to the K regional characteristics. The living body detection is performed on the K regional images to obtain the K detection results according to the P iris-based living body detection schemes.

In an implementation, in terms of dividing the iris image into the K regional images, the at least one processor is configured to divide the iris image into the K regional images according to a preset grid, or divide the iris image into the K regional images of equal area.

In an implementation, the region characteristic is at least one of a number of feature points, an image quality evaluation value, definition, entropy, and average brightness.

In an implementation, in terms of determining, according to the K detection results, whether the iris image is from an iris of a living body, the at least one processor is configured to perform the following. Determine a reliability level corresponding to each of the P iris-based living body detection schemes to obtain P reliability levels. The K detection results and the P reliability levels are weighted to obtain a target detection result. Determine that the iris image is from an iris of a living body when the target detection result is greater than a preset threshold.

In an implementation, in terms of obtaining the iris image, the at least one processor is configured to perform the following. A test image is obtained. The iris image is extracted from the test image.

In an implementation, in terms of extracting the iris image from the test image, the at least one processor is configured to perform the following. Eye recognition is performed on the test image to obtain an eye image. Contour extraction is performed on the eye image to obtain a contour image. An iris contour is determined from the contour image according to an eye structure. The iris image is extracted from the eye image according to the iris contour.

In an implementation, the at least one processor is further configured to perform the following. Image enhancement is performed on the iris image. In terms of dividing the iris image into the K regional images, the at least one processor is configured to perform the following. The iris image subjected to the image enhancement is divided into the K regional images.

In an implementation, the at least one processor is further configured to perform the following. Image quality evaluation is performed on the iris image to obtain an image quality evaluation value. Proceed to perform the image enhancement on the iris image when the image quality evaluation value is lower than a preset quality threshold.

In an implementation, in terms of performing the image quality evaluation on the iris image to obtain the image quality evaluation value, the at least one processor is configured to perform the following. The image quality evaluation is performed on the iris image with at least one image quality evaluation indicator to obtain the image quality evaluation value.

Figure 4A:
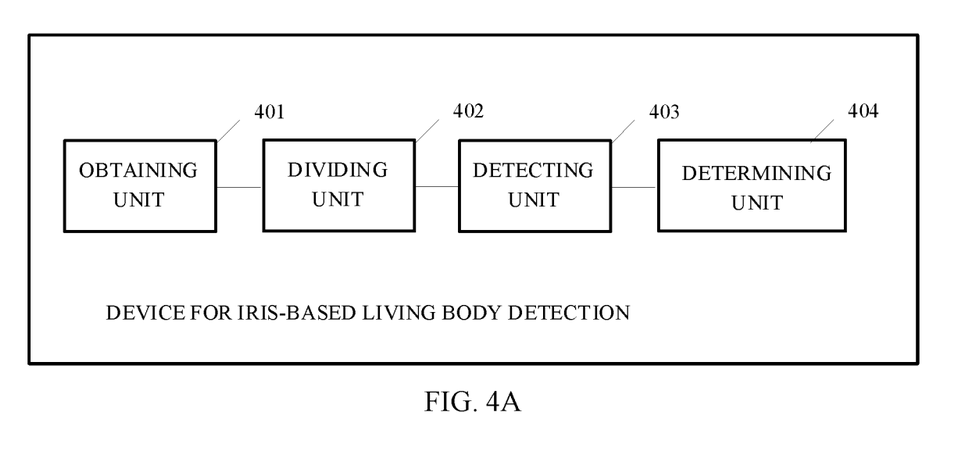
FIG. 4A is a schematic structural diagram of a device for iris living body detection according to implementations of the disclosure.

FIG. 4A is a schematic structural diagram of a device for iris-based living body detection according to the implementation. The device for iris living body detection is applied to an electronic device, and the device for iris living body detection includes an obtaining unit 401, a dividing unit 402, a detecting unit 403, and a determining unit 404. The obtaining unit 401 is configured to acquire an iris image. The dividing unit 402 is configured to divide the iris image into K regional images, where K is an integer greater than one. The detecting unit 403 is configured to perform living body detection on the K regional images with P iris-based living body detection schemes to obtain K detection results, where P is an integer greater than one and less than or equal to K. The determining unit 404 is configured to determine, according to the K detection results, whether the iris image is obtained from an iris of a living body.

Figure 4B:
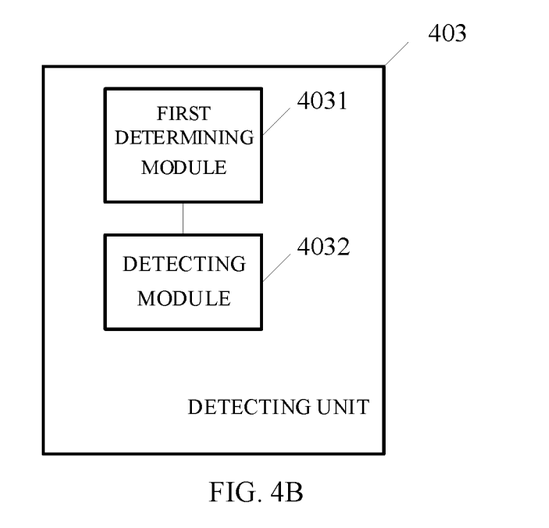
FIG. 4B is a schematic structural diagram of a detecting unit of the device for iris living body detection described in FIG. 4A according to implementations of the disclosure.

FIG. 4B is a structure of the detecting unit 403 of the device for iris-based living body detection described in FIG. 4A. The detecting unit 403 includes a first determining module 4031 and a detecting module 4032. The first determining module 4031 is configured to determine a regional characteristic of each of the K regional images to obtain K regional characteristics, and to determine, according to a mapping relationship between preset regional characteristics and iris-based living body detection schemes, the P iris-based living body detection schemes corresponding to the K regional characteristics. The detecting module 4032 is configured to perform, according to the P iris-based living body detection schemes, the living body detection on the K regional images to obtain the K detection results.

The regional characteristic is at least one of a number of feature points, an image quality evaluation value, definition, entropy, and average brightness.

Figure 4C:
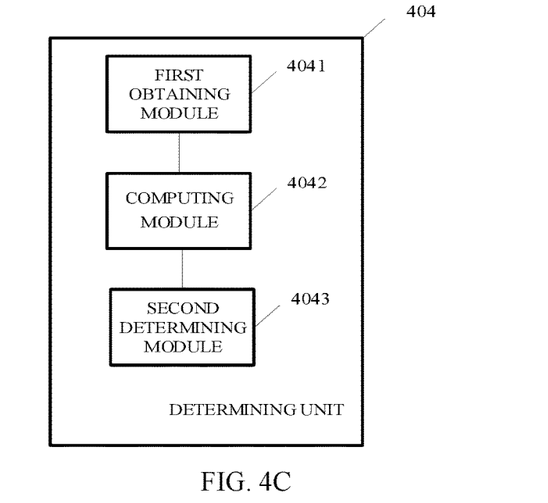
FIG. 4C is a schematic structural diagram of a determining unit of the device for iris living body detection described in FIG. 4A according to implementations of the disclosure.

FIG. 4C is a structure of the determining unit 404 of the device for iris-based living body detection described in FIG. 4A. The determining unit 404 may include a first obtaining module 4041, a computing module 4042, and a second determining module 4043. The first obtaining module 4041 is configured to obtain a reliability level corresponding to each of the P iris-based living body detection schemes to obtain P reliability levels. The computing module 4042 is configured to weight the K detection results and the P reliability levels to obtain a target detection result. The second determining module 4043 is configured to determine that the iris image is obtained from an iris of a living body when the target detection result is greater than a preset threshold.

Figure 4D:
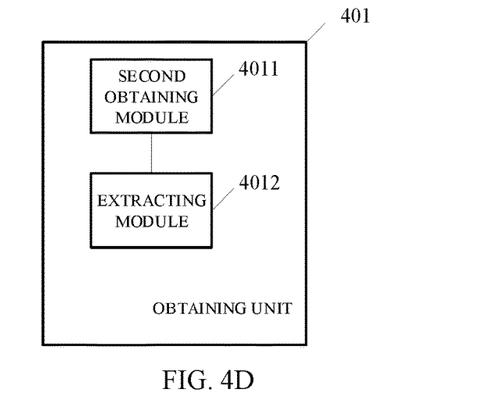
FIG. 4D is a schematic structural diagram of an obtaining unit of the device for iris living body detection described in FIG. 4A according to implementations of the disclosure.

FIG. 4D is a structure of the obtaining unit 401 of the device for iris-based living body detection described in FIG. 4A. The obtaining unit 401 may include a second obtaining module 4011 and an extracting module 4012. The second obtaining module 4011 is configured to obtain a test image. The extracting module 4012 is configured to extract the iris image from the test images.

Furthermore, the extracting module 4012 configured to extract the iris image from the test image is configured to: perform eye recognition on the test image to obtain an eye image, perform contour extraction on the eye image to obtain a contour image, determine an iris contour from the contour image according to an eye structure, and extract the iris image from the eye image according to the iris contour.

Figure 4E:
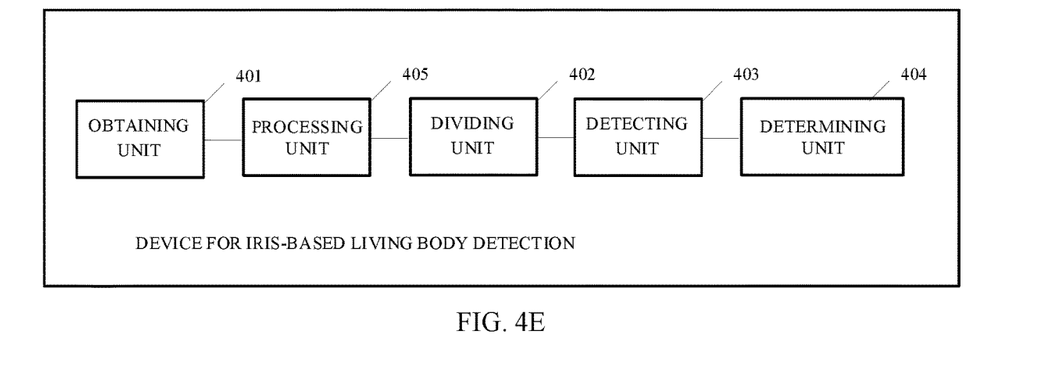
FIG. 4E is a schematic structural diagram of the device for iris living body detection described in FIG. 4A according to other implementations of the disclosure.

FIG. 4E is a modification of the structure of the device for iris-based living body detection described in FIG. 4A. The device may further include a processing unit 405. The processing unit 405 is configured to perform image enhancement on the iris image. The dividing unit is configured to divide the iris image subjected to the image enhancement into the K regional images.

Figure 4F:
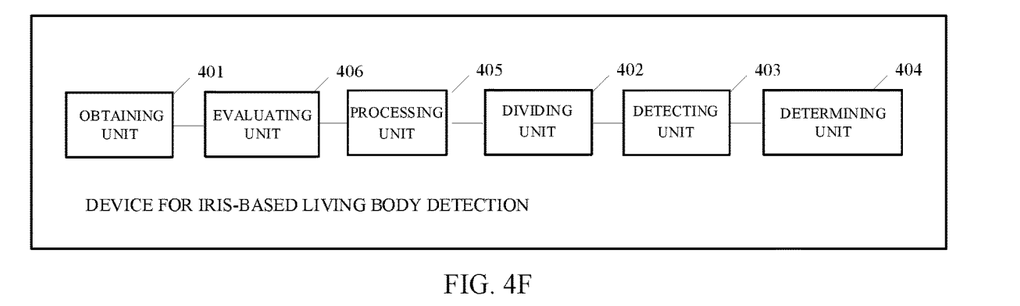
FIG. 4F is a schematic structural diagram of the device for iris living body detection described in FIG. 4A according to other implementations of the disclosure.

FIG. 4F is a modification of the structure of the device for iris living body detection described in FIG. 4A. The device may further include an evaluating unit 406. The evaluating unit 406 is configured to perform image quality evaluation on the iris image to obtain an image quality evaluation value. The processing unit 405 is configured to proceed to perform the image enhancement on the iris image when the image quality evaluation value is lower than a preset quality threshold.

Furthermore, the evaluating unit 406 configured to perform the image quality evaluation on the iris image to obtain the image quality evaluation value is configured to: perform the image quality evaluation on the iris image with at least one image quality evaluation indicator to obtain the image quality evaluation value.

It is to be understood that the functions of the program modules of the device for iris-based living body detection of the implementation may be implemented according to the method in the foregoing method implementations. For the specific implementation process, reference may be made to the related description of the foregoing method implementations, and details are not described herein again.

Figure 5:
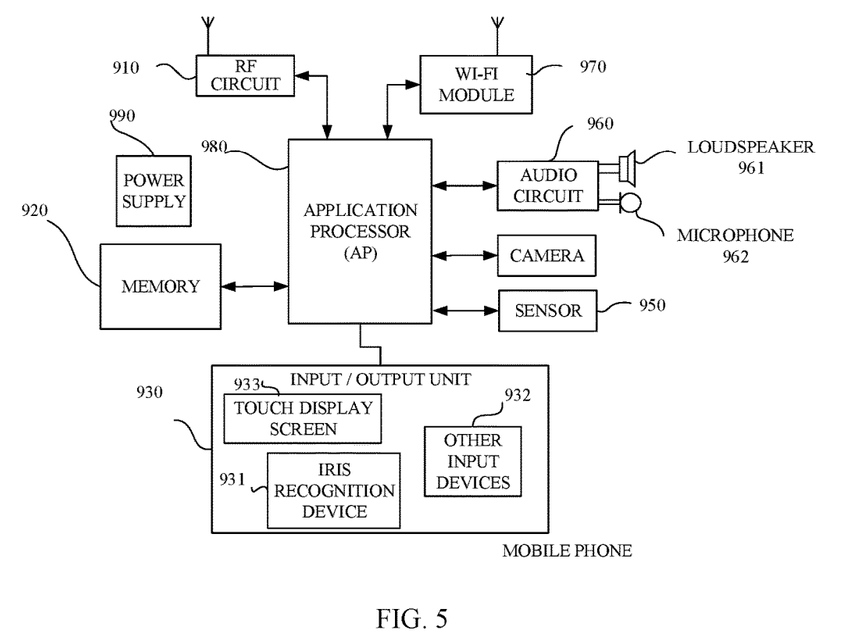
FIG. 5 is a schematic structural diagram of an electronic device according to other implementations of the disclosure.

Implementations of the disclosure further provide another electronic device, as illustrated in FIG. 5. For the convenience of description, only parts associated with the implementations of the disclosure are illustrated. Specific technical details that are not disclosed refer to parts of the method in the implementations of the disclosure. The electronic device may be any terminal device including a mobile phone, a tablet computer, a personal digital assistant (PDA), a point of sales (POS) and an on-board computer. A mobile phone is taken as an electronic device.

FIG. 5 illustrates a partial structure diagram illustrating a mobile phone associated with an electronic device according to some implementations of the disclosure. Referring to FIG. 5, the mobile phone includes an RF circuit 910, a memory 920, an input unit 930, a sensor 950, an audio circuit 960, a wireless-fidelity (Wi-Fi) module 970, an AP 980, a power supply 990, and other parts. A person skilled in the art may understand that a mobile phone structure illustrated in FIG. 5 is not limitative to the mobile phone, and the mobile phone may include parts more or fewer than those illustrated in the figure, or combine some parts, or have different part arrangements.

Each component of the mobile phone will be introduced below in conjunction with FIG. 5.

The input unit 930 may be configured to receive input digital or character information and generate key signal input associated with user setting and functional control of the mobile phone. In an example, the input unit 930 may include a touch display screen 933, an iris recognition device 931, and other input devices 932. The iris recognition device 931 is coupled to the touch display screen 933, and the iris recognition area of the iris recognition device 931 is located in the first area of the touch display screen 933. In an example, the other input devices 932 may include, but are not limited to, one or more of a physical keyboard, a functional key (such as a volume control key and a switch key), a track ball, a mouse and an operating rod.

The iris recognition device 931 is configured to obtain an iris image.

The AP 980 is configured to: divide the iris image into K regional images, where K is an integer greater than one, perform living body detection on the K regional images with P iris-based living body detection schemes to obtain the K detection results, where P is an integer greater than one and less than or equal to K, and determine whether the iris image is obtained from an iris of a living body according to the K detection results.

The AP 980 is a control center of the mobile phone, and is configured to connect all parts of the whole mobile phone by utilizing various interfaces and lines, to run or execute the software program and/or the module stored in the memory 920, and to call data stored in the memory 920 to execute various functions and processing data of the mobile phone, so as to wholly monitor the mobile phone. Alternatively, the AP 980 may include one or more processing units. Alternatively, the AP 980 may be integrated with an application processor and a modulation-demodulation processor, and the application processor mainly processes an operation system, a user interface, an application program and the like, and the modulation-demodulation processor mainly processes wireless communication. It may be understood that the modulation-demodulation processor may not be integrated into the AP 980.

In addition, the memory 920 may include a high-speed random access memory, and may further include a non-volatile memory such as a disk storage device, a flash device, or other non-volatile solid storage devices.

The RF circuit 910 may be configured to receive and transmit information. Usually, the RF circuit 910 includes, but not limited to, an antenna, at least one amplifier, a transceiver, a coupler, a low noise amplifier (LNA), a duplexer, etc. In addition, the RF circuit 910 may further communicate with other devices via wireless communication and a network. The wireless communication may use any communication standard or protocol, including, but not limited to, a global system of mobile communication (GSM), general packet radio service (GPRS), code division multiple access (CDMA), wideband code division multiple access (WCDMA), long term evolution (LTE), an email, short messaging service (SMS), etc.

The mobile phone may further include at least one sensor 950 such as a light sensor, a motion sensor, and other sensors. In an example, the light sensor may include an ambient light sensor and a proximity sensor, the ambient light sensor may adjust the luminance of the touch display screen according to the brightness of ambient light, and the proximity sensor may cause the touch display screen and/or backlight to be turned off. As one of the motion sensors, an accelerometer sensor may detect the magnitude of an accelerated speed in each direction (generally, three-axis), the size and direction of a gravity may be detected while resting, and the accelerometer sensor may be used in applications related to attitudes of the mobile phone (e.g., horizontal and vertical screen switching, relevant games, and magnetometer attitude calibration), and vibration identification relevant functions (e.g., pedometer and knocking). Other sensors such as a gyroscope sensor, a barometer sensor, a hygrometer sensor, a thermometer sensor, and an infrared sensor may also be equipped in the mobile phone, which will not be elaborated herein.

The audio circuit 960, a loudspeaker 961 and a microphone 962 may provide an audio interface between the user and the mobile phone. The audio circuit 960 may transmit an electric signal converted from the received audio data to the loudspeaker 961, and the loudspeaker 961 converts the electric signal into a sound signal for playing. Besides, the microphone 962 converts a collected sound signal into an electric signal, the audio circuit 960 converts the received electric signal into audio data and then outputs the audio data to the AP 980 for processing, the audio data is transmitted to another mobile phone via the RF circuit 910, or the audio data is output to the memory 920 for further processing.

Wi-Fi is a short-range wireless transmission technology, the mobile phone may assist the user in email receiving and sending, webpage browsing, access to streaming media and the like by means of the Wi-Fi module 970, and it provides wireless wideband internet access for the user. Although FIG. 5 illustrates the Wi-Fi module 970, it may be understood that the Wi-Fi module is not a necessary component of the mobile phone and can be omitted as required, without changing the essence of the disclosure.

The mobile phone furthers include a power supply 990 (such as a battery) for supplying power to each component. Alternatively, the power supply may be connected with the AP 980 logically via a power supply management system, so as to implement functions of charging, discharging and power consumption management by means of the power supply management system.

Although not illustrated, the mobile phone may also include a camera, a Bluetooth module, etc., and will not be elaborated herein.

In the implementations illustrated in FIG. 1B and FIG. 2, each method flow may be implemented based on the structure of the mobile phone.

In the implementations illustrated in FIG. 3, and FIG. 4A to FIG. 4F, each unit function may be implemented based on the structure of the mobile phone.

Implementations of the disclosure also provide a non-transitory computer readable storage medium. The non-transitory computer readable storage medium is configured to store a computer program which, when executed by a processor, causes the processor to execute the following. An iris image is divided into K regional images, where K is an integer greater than one. P iris-based living body detection schemes are applied on the K regional images, to obtain K detection results, where P is an integer greater than one and less than or equal to K. Whether the iris image is obtained from an iris of a living body is determined according to the K detection results.

The implementations of the disclosure also provide a computer program product. The computer program product includes a non-transitory computer readable storage medium configured to store computer programs. The computer programs are operable with a computer to execute some or all operations of any method for iris-based living body detection in the above-mentioned method implementation.

It is to be noted that for simplifying the description, each of the above-mentioned method implementations is expressed as a series of action combinations. However, a person skilled in the art should learn that the disclosure is not limited by a described action sequence. That is because some operations may be executed in other sequences or at the same time according to the disclosure. Secondly, a person skilled in the art should also learn that the implementations described in the specification fall within preferable implementations, and involved actions and modules may not be necessary for the disclosure.

In the above-mentioned implementations, descriptions for each implementation are emphasized respectively, and parts which are not elaborated in a certain implementation may refer to relevant descriptions for other implementations.

In some implementations provided by the disclosure, it is to be understood that the disclosed apparatus may be implemented in another manner. For example, the apparatus implementation described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The above-mentioned units described as separate parts may or may not be physically separated, and parts displayed as units may or may not be physical units, and namely may be located in the same place, or may also be distributed to multiple network units. Part or all of the units may be selected to achieve the purpose of the solutions of the present implementation according to a practical requirement.

In addition, each function unit in each implementation of the disclosure may be integrated into a processing unit, each unit may also exist independently, and two or more than two units may also be integrated into a unit. The above-mentioned integrated unit may be implemented in a form of hardware, and may also be implemented in a form of software function unit.

When implemented in form of software function unit and sold or used as an independent product, the integrated unit may also be stored in a computer-readable storage medium. Based on such an understanding, the technical solutions of the disclosure substantially or parts making contributions to the conventional art may be embodied in form of software product, and the computer software product is stored in a storage medium, including a plurality of instructions configured to enable a computer device (which may be a personal computer, a server, a network device or the like) to execute all or part of the method in each implementation of the disclosure. The above-mentioned memory includes: various media capable of storing program codes such as a U disk, a read-only memory (ROM), a random-access memory (RAM), a mobile hard disk, a magnetic disk or an optical disk.

Those of ordinary skill in the art may understand that all or some operations in each method in the above-mentioned implementations may be completed by instructing relevant hardware through a program, where the program may be stored in a computer-readable memory, and the memory may include a flash disk, an ROM, an RAM, a magnetic disk or an optical disk.

The implementations of the disclosure have been described in detail above, and the principles and the implementation manners of the disclosure have been described in specific examples herein. The above-mentioned implementations are only used to help understand the method and the core idea of the disclosure. Meanwhile, those of ordinary skill in the art, based on the idea of the disclosure, will have changes in specific implementation manners and application ranges. In summary, the contents of this specification should not be construed as limiting the disclosure.

What is claimed is:

1. A method for iris-based living body detection implemented in an electronic device, the method comprising:
dividing, by the electronic device, an iris image into K regional images, wherein there is no overlap between the K regional images and K is an integer greater than one;
performing, by the electronic device, living body detection on the K regional images with P types of iris-based living body detection schemes to obtain K detection results, wherein P is an integer greater than one and less than or equal to K; and
determining, according to the K detection results, whether the iris image is obtained from an iris of a living body by the electronic device;
wherein one iris-based living body detection scheme is used for performing the living body detection on one of the K regional images when P=K, or one iris-based living body detection scheme is used for performing the living body detection on a plurality of regional images of the K regional images when P is less than K.

2. The method of claim 1, wherein dividing the iris image into the K regional images comprises one of the following:
dividing the iris image into the K regional images according to a preset grid, and
dividing the iris image into the K regional images of equal area.

3. The method of claim 1, wherein performing the living body detection on the K regional images with the P types of iris-based living body detection schemes to obtain the K detection results comprises:
determining a regional characteristic of each of the K regional images to obtain K regional characteristics;
determining, according to a mapping relationship between preset regional characteristics and iris-based living body detection schemes, the P types of iris-based living body detection schemes corresponding to the K regional characteristics; and
performing, according to the P types of iris-based living body detection schemes, the living body detection on the K regional images to obtain the K detection results.

4. The method of claim 3, wherein the regional characteristic is at least one of a number of feature points, an image quality evaluation value, definition, entropy, and average brightness.

5. The method of claim 1, wherein determining, according to the K detection results, whether the iris image is obtained from an iris of a living body comprises:
   determining a reliability level corresponding to each of the P types of iris-based living body detection schemes to obtain P reliability levels;
   weighting the K detection results and the P reliability levels to obtain a target detection result; and
   determining that the iris image is obtained from an iris of a living body when the target detection result is greater than a preset threshold.

6. The method of claim 1, further comprising:
   performing eye recognition on a test image to obtain an eye image;
   performing contour extraction on the eye image to obtain a contour image;
   determining, according to an eye structure, an iris contour from the contour image; and
   extracting, according to the iris contour, the iris image from the eye image.

7. The method of claim 1, wherein:
   the method further comprises:
      performing image enhancement on the iris image; and
   dividing the iris image into the K regional images comprises:
      dividing the iris image subjected to the image enhancement into the K regional images.

8. The method of claim 7, further comprising:
   performing image quality evaluation on the iris image to obtain an image quality evaluation value; and
   proceeding to performing the image enhancement on the iris image when the image quality evaluation value is lower than a preset quality threshold.

9. The method of claim 8, wherein performing the image quality evaluation on the iris image to obtain the image quality evaluation value comprises:
   performing the image quality evaluation on the iris image with at least one image quality evaluation indicator to obtain the image quality evaluation value.

10. An electronic device, comprising:
    a camera configured to obtain an iris image;
    at least one processor coupled with the camera; and
    a computer readable storage coupled with the at least one processor and storing at least one computer executable instruction thereon which, when executed by the at least one processor, causes the at least one processor to:
       divide the iris image into K regional images, wherein there is no overlap between the K regional images and K is an integer greater than one;
       apply P types of iris-based living body detection schemes on the K regional images, to obtain K detection results, wherein P is an integer greater than one and less than or equal to K; and
       determine, according to the K detection results, whether the iris image is obtained from an iris of a living body;
    wherein one iris-based living body detection scheme is used for performing the living body detection on one of the K regional images when P=K, or one iris-based living body detection scheme is used for performing the living body detection on a plurality of regional images of the K regional images when P is less than K.

11. The electronic device of claim 10, wherein the at least one processor configured to divide the iris image into the K regional images is configured to perform one of the following:
    divide the iris image into the K regional images according to a preset grid, and
    divide the iris image into the K regional images of equal area.

12. The electronic device of claim 10, wherein the at least one processor configured to perform the living body detection on the K regional images with the P types of iris-based living body detection schemes to obtain the K detection results is configured to:
    determine a regional characteristic of each of the K regional images to obtain K regional characteristics;
    determine, according to a mapping relationship between preset regional characteristics and iris-based living body detection schemes, the P types of iris-based living body detection schemes corresponding to the K regional characteristics; and
    perform, according to the P types of iris-based living body detection schemes, the living body detection on the K regional images to obtain the K detection results.

13. The electronic device of claim 12, wherein the regional characteristic is at least one of a number of feature points, an image quality evaluation value, definition, entropy, and average brightness.

14. The electronic device of claim 10, wherein the at least one processor configured to determine, according to the K detection results, whether the iris image is obtained from an iris of a living body is configured to:
    obtain a reliability level corresponding to each of the P types of iris-based living body detection schemes to obtain P reliability levels;
    weight the K detection results and the P reliability levels to obtain a target detection result; and
    determine that the iris image is obtained from an iris of a living body when the target detection result is greater than a preset threshold.

15. The electronic device of claim 10, wherein the at least one processor configured to obtain the iris image is configured to:
    obtain a test image; and
    extract the iris image from the test image.

16. The electronic device of claim 15, wherein the at least one processor configured to extract the iris image from the test image is configured to:
    perform eye recognition on the test image to obtain an eye image;
    perform contour extraction on the eye image to obtain a contour image;
    determine, according to an eye structure, an iris contour from the contour image; and
    extract, according to the iris contour, the iris image from the eye image.

17. The electronic device of claim 10, wherein:
    the at least one processor is further configured to:
       perform image enhancement on the iris image; and
    the at least one processor configured to divide the iris image into the K regional images is configured to:
       divide the iris image subjected to the image enhancement into the K regional images.

18. The electronic device of claim 17, wherein the at least one processor is further configured to:
    perform image quality evaluation on the iris image to obtain an image quality evaluation value; and proceed to performing the image enhancement on the iris image when the image quality evaluation value is lower than a preset quality threshold.

19. A non-transitory computer readable storage medium storing a computer program which, when executed by a processor, causes the processor to:
- divide an iris image into K regional images, wherein there is no overlap between the K regional images and K is an integer greater than one;
- apply P types of iris-based living body detection schemes on the K regional images, to obtain K detection results, wherein P is an integer greater than one and less than or equal to K; and
- determine, according to the K detection results, whether the iris image is obtained from an iris of a living body;
  - wherein one iris-based living body detection scheme is used for performing the living body detection on one of the K regional images when P=K, or one iris-based living body detection scheme is used for performing the living body detection on a plurality of regional images of the K regional images when P is less than K.

\* \* \* \* \*